(12) United States Patent
Kienzle

(10) Patent No.: US 7,959,381 B2
(45) Date of Patent: Jun. 14, 2011

(54) THREAD MILLING TOOL

(75) Inventor: Richard D. Kienzle, Evans, GA (US)

(73) Assignee: Kennametal Inc., Latrobe, PA (US)

( * ) Notice: Subject to any disclaimer, the term of this patent is extended or adjusted under 35 U.S.C. 154(b) by 1422 days.

(21) Appl. No.: 10/170,857

(22) Filed: Jun. 13, 2002

(65) Prior Publication Data

US 2003/0231934 A1 Dec. 18, 2003

(51) Int. Cl.
*B26D 1/00* (2006.01)
*B26D 3/06* (2006.01)

(52) U.S. Cl. ................... 407/24; 407/54; 407/60

(58) Field of Classification Search ............ 407/24, 407/30, 29, 54, 63, 53, 59, 60; 408/222, 408/22; 409/74

See application file for complete search history.

(56) References Cited

U.S. PATENT DOCUMENTS

| 3,704,648 A | 12/1972 | Burfoot ................ 90/11.62 |
| 3,774,501 A | 11/1973 | Brown et al. ............ 90/11.64 |
| 4,721,421 A * | 1/1988 | Klinger ..................... 407/63 |
| 4,831,674 A | 5/1989 | Bergström et al. ............ 10/140 |
| 4,943,191 A * | 7/1990 | Schmitt ..................... 408/1 R |
| 4,943,199 A | 7/1990 | Hillen ....................... 408/1 R |
| 5,080,538 A | 1/1992 | Schmitt ..................... 409/66 |
| 5,088,861 A | 2/1992 | Little ....................... 407/11 |
| 5,098,232 A | 3/1992 | Benson ...................... 407/33 |
| 5,272,940 A * | 12/1993 | Diskin ....................... 76/108.6 |
| 5,413,438 A | 5/1995 | Turchan ..................... 409/66 |
| 5,527,316 A * | 6/1996 | Stone et al. ................. 606/80 |
| 6,042,308 A | 3/2000 | Schmidt ..................... 407/24 |
| 6,062,059 A * | 5/2000 | Feldcamp .................... 72/271 |
| 6,168,355 B1 * | 1/2001 | Wardell ...................... 407/54 |
| 6,200,078 B1 | 3/2001 | Kubota ...................... 409/74 |
| 6,231,281 B1 | 5/2001 | Nishikawa .................. 408/222 |
| 6,257,810 B1 | 7/2001 | Schmidt ..................... 409/66 |
| 6,293,740 B1 | 9/2001 | Schulte ...................... 409/66 |
| 6,345,941 B1 | 2/2002 | Fang et al. .................. 409/74 |

FOREIGN PATENT DOCUMENTS

| DE | 199 27 386 A1 | 6/1999 |
| GB | 380391 | 4/1932 |

OTHER PUBLICATIONS

Siegfried Foshag aus Rothenberg, "Kinematik und Technologie des Gewindefrashohrens", Dissertation, 1994.

* cited by examiner

*Primary Examiner* — Willmon Fridie, Jr.
(74) *Attorney, Agent, or Firm* — Larry R. Meenan

(57) ABSTRACT

A thread milling tool includes a proximal shank portion and a distal cutting portion. The cutting portion includes at least one thread milling tooth and at least one flute oriented helically, or spirally, about a central rotational axis of the tool. The cutting portion may be configured to form internal or external threads in a workpiece as the cutting portion moves relative to the workpiece. The teeth of the thread milling tool have a negative taper angle or back taper to offset deflection of the tool during milling operations.

22 Claims, 2 Drawing Sheets

THREAD MILLING TOOL

BACKGROUND OF THE INVENTION

1. Field of the Invention

This invention relates to thread milling tool. More particularly, this invention relates to thread milling tool that includes a proximal shank portion and a distal cutting portion with a plurality of thread milling teeth having a negative taper angle for creating internal and/or external threads in metallic and other work pieces.

2. Description of the Related Art

Thread cutting tools are known for cutting either internal threads in predrilled holes in a workpiece or external threads on a perimeter of a workpiece. These thread milling tools are typically known as "thread mills". A typical thread mill has a shank portion and a thread cutting portion. Thread mills generally produce higher quality threaded workpieces when compared to other threading tools, such as taps.

The thread cutting portion of a thread mill may include thread-milling teeth and flutes. A typical thread mill may have between two to four flutes but may include more than four flutes for certain sizes and milling applications. Flutes may be provided on thread mills to provide cutting edges and to channel the chips produced during the milling operation out of a hole that is being threaded. The flutes defined in thread mills may be straight or oriented in a spiral or helical pattern having either a right-handed or a left-handed direction. Straight flutes lie generally parallel to the longitudinal axis of the thread mill extending from the end of the cutting portion and along the cutting portion. Helical or spiral flutes may be defined by a helix angle and wrap around the external surface of the thread mill. As used herein, the helix angle is the constant angle between the spiral flute and the central rotational axis of the cutting tool or any line parallel to the central rotational axis. Those of ordinary skill will understand and may readily determine the helix angle for a particular cutting tool.

The thread-cutting teeth of thread mills may be configured to form threads defined by ISO standards or may have any other thread shape. The thread-cutting teeth have a configuration complementary to that of the threads to be formed on the inner surface of the bore or the external surface of the workpiece. The flutes defined in the cutting portion of the thread mill separate the rows of thread-cutting teeth. The taper angle of the thread milling tool is defined by a successive change in the distance between the central rotational axis of the tool and the crest of individual thread-cutting teeth as the thread-cutting teeth approach the terminal end of the cutting portion of the thread milling tool. A successive decrease in the distance between the central rotational axis of the tool and the crest of individual thread-cutting teeth as the thread-cutting teeth approach the terminal end defines a positive taper angle or forward taper. On the other hand, a successive increase in the distance between the central rotational axis of the tool and the crest on individual thread-cutting teeth as the thread-cutting teeth approach the terminal end defines a negative taper angle or back taper.

SUMMARY OF THE INVENTION

Briefly, according to this invention, there is provided a thread milling tool comprising a proximal shank portion, a distal cutting portion including at least one helically oriented flute and a plurality of thread milling teeth, wherein the plurality of thread milling teeth define a negative taper angle or back taper. A method of making a thread milling tool is also disclosed.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
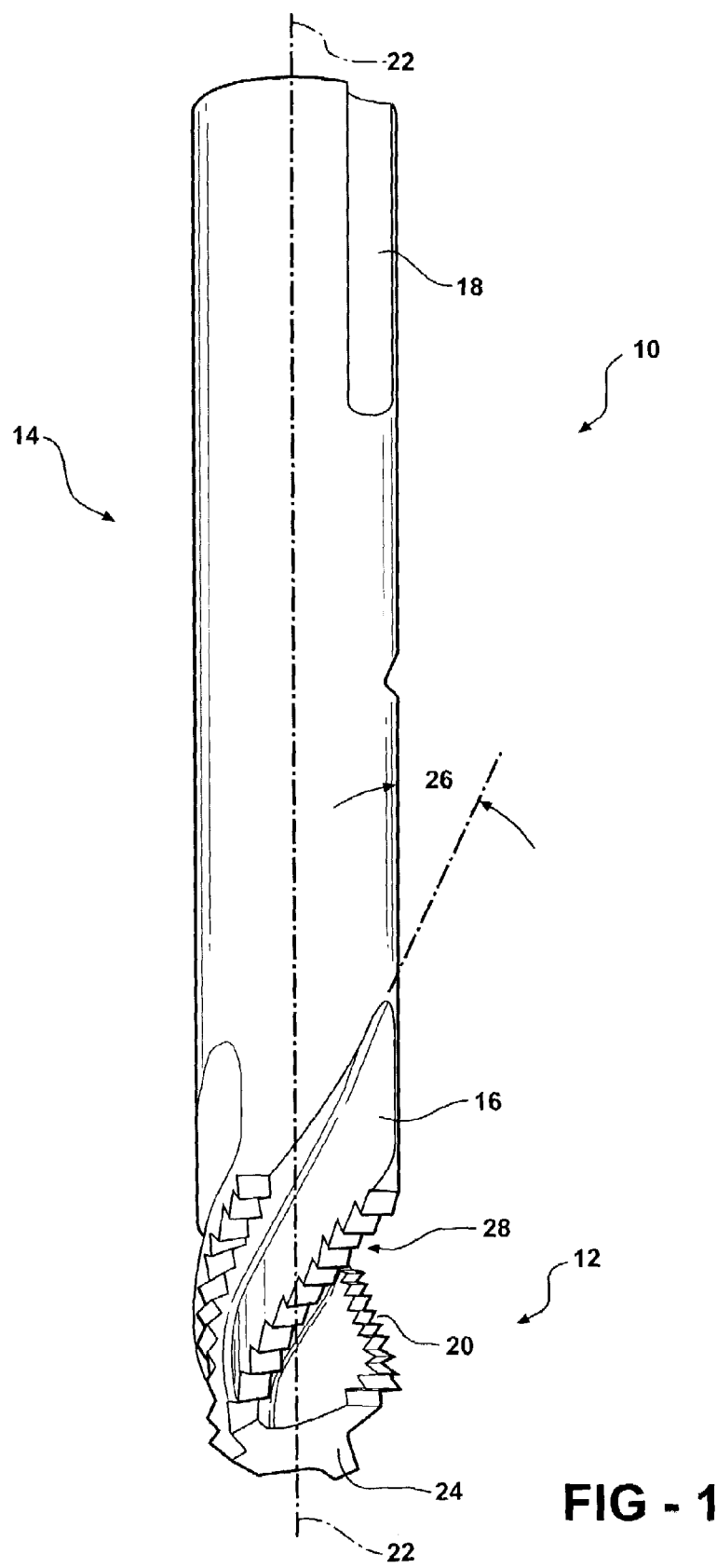
FIG. 1 is a perspective view of an embodiment of a thread milling tool constructed according to the present invention.

Referring to the drawings, wherein like reference characters represent like elements, an embodiment of a thread milling tool constructed according to the present invention, designated generally as 10, is depicted in FIG. 1. The thread milling tool 10 is adapted for providing internal threads in holes in a work piece, while the tool's helical flutes, described below, simultaneously produce a lifting action which forces all or a portion of the chips through the flute and out of the hole that is being threaded. The thread milling tool 10 may be fabricated from a high speed steel material or from any other suitable material. Such other suitable materials may include, for example, spring steels, solid carbide material, solid carbide material with a steel core, tool steels, or sintered steels. Other materials that may be used to construct the thread milling tool 10 will be apparent to those of ordinary skill in the art and, as is known in the art, the suitability of a particular material will be at least partially dependent on the intended application of the thread milling tool.

The thread milling tool 10 includes a cutting portion 12 and a shank portion 14. The cutting portion is of a tapered design and includes a plurality of flutes 16. The shank portion 14 of the thread milling tool 10 is constructed so that the thread milling tool 10 may be suitably mounted to the spindle of a machine tool such as, for example, a milling machine or a machining center. A locating slot, such as locating slot 18, may be provided on the shank portion 14 to ensure that the thread milling tool 10 is mounted to the spindle of a machine tool in a correct orientation. The shank portion 14 may be of a standard design, such as a Weldon shank, to ensure consistency of the milling operation after tool changes. The cutting portion 12 includes a plurality of banks of cutting studs or teeth 20, which are separated by the flutes 16. The flutes 16 are helically oriented relative to a central rotational axis 22 of the thread milling tool 10. The arrangement of the helical flutes 16 and cutting teeth 20 is such that a plurality of individual banks of teeth are disposed in a helical orientation relative to the central rotational axis 22 of the thread milling tool 10 in a direction progressing from a terminal end 24 of the cutting portion 12 toward the shank portion 14. The helical flutes 16 form a helix angle 26, which is the angle between the central rotational axis 22 of the thread milling tool 10 or a line parallel to the central rotational axis 22 and the flutes 16. The helix angle 26 of a thread milling tool 10 constructed according to the present invention may be any suitable angle greater than or equal to 20 degrees. Preferably, the helix angle 26 is within the range of 20 degrees to 40 degrees, inclusive. The number of helically oriented flutes 16 provided on thread milling tools constructed according to the present invention may be any suitable number, and is preferably from two to six. The actual number of flutes 16 provided will depend largely on the diameter of the thread milling tool and its intended application.

The banks of cutting teeth 20 are configured to delineate several thread forms 28, and the thread forms may have various configurations defined by International Standards Organization (ISO) or other standards. The thread forms 28 may be of any suitable design, many of which are described in industry specifications, including ISO standards.

Figure 2:
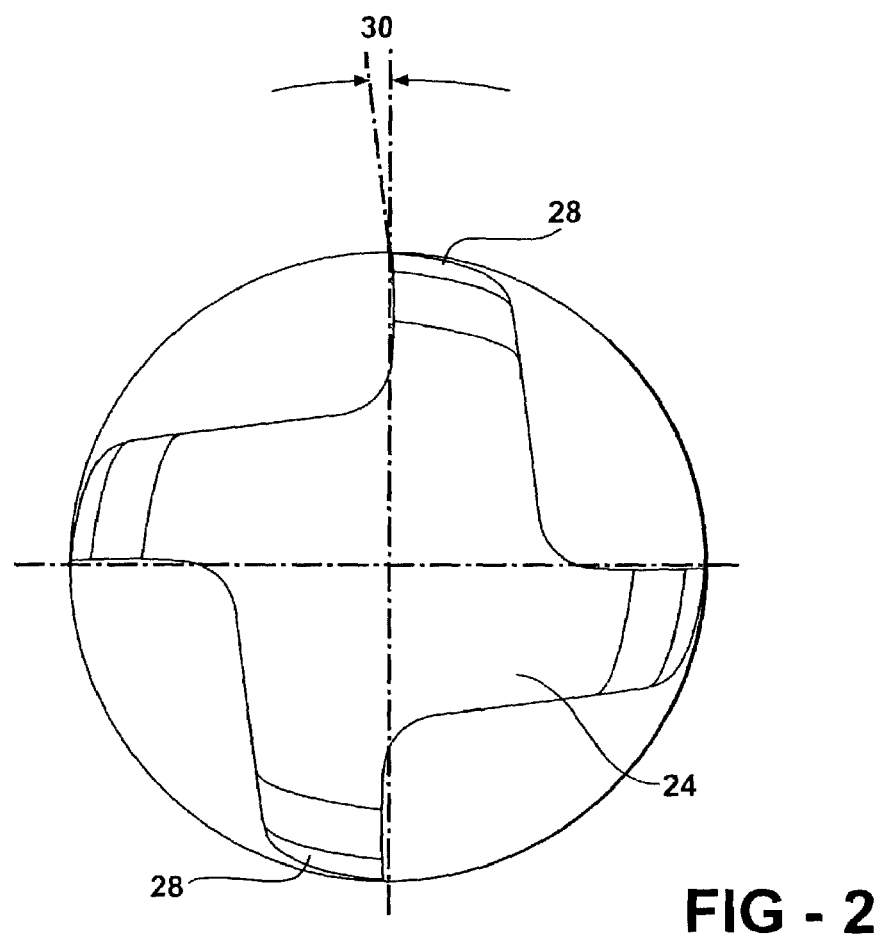
FIG. 2 is an end view of the thread milling tool illustrated in FIG. 1, showing the rake angle formed by the leading edge of a thread form on the cutting portion of the thread milling tool.

With reference to FIG. 2, each of the thread forms 28 defines a top rake angle 30. The top rake angle 30 may be any suitable rake angle as is known in the art, and preferably is from 10 degrees to 20 degrees.

During a thread milling operation, side forces exist that cause deflection on the thread milling tool and can be approximated by the forces exerted on a cantilevered beam. Assuming a uniform load across the width of a beam, the maximum deflection of the beam supported at one end can be expressed according to the following equation:

$$\text{Maximum Deflection} = (W^* L^3)/(8^* E^* I) \quad (1)$$

where,
W=total force on the beam (lbs),
L=length of overhang of beam from support section (inches),
E=Young's Modulus of Elasticity (lb/in$^2$), and
I=Moment of Inertia for the cross section (inches to 4$^{th}$ power).

The assumption that the load is uniform during a thread milling operation is acceptable because each tooth in the length of cut is removing the same amount of metal.

The force, W, can be estimated from the horsepower that is consumed using the volume of material removed expressed in cubic inches per minute. The horsepower is multiplied by a well-known horsepower constant that depends on the workpiece material to obtain a consumed horsepower as a function of the workpiece material. The horsepower constant varies with different workpiece materials and is well-known in the art. For example, the horsepower constant as a function of workpiece material can be found in most Machinery Handbooks. Then, the consumed horsepower can be converted to ft-lbs/min by multiplying the consumed horsepower by the conversion: 1 hp=33000 ft-lbs/min. Then, the horsepower in ft-lbs/min is divided by the surface footage of the cutting tool (ft/min) to get the force, W.

The length of overhang of the beam, L, can be determined from the length of thread milling tool that extends from the tool holder. The length extending from the tool holder is a good estimate on thread milling tools where the diameter of the cutting portion and the diameter of the shank portion are approximately equal. Otherwise, the length extending from the tool holder it is a good approximation on thread milling tools where the diameter of the cutter portion is smaller than the diameter of the shank portion.

The Young's Modulus of Elasticity, E, for high-speed steel, for example, is approximately 30,000,000 lbs/in$^2$.

The moment of inertia, I, can be calculated using a percentage of the thread milling tool diameter and is equal to approximately 0.049 multiplied by the thread milling tool diameter to the fourth power.

Equation (1) yields a maximum deflection of approximately 0.0003 inches to approximately 0.0012 inches per side, depending on the workpiece material for a thread milling tool having a diameter of approximately 0.375 inches. However, it should be noted that the amount of deflection is a function of the length and diameter of the thread milling tool. Because the length of the cut section becomes larger with the diameter of the thread milling tool, the amount of deflection across the entire size range is constant for each workpiece material. Thus, a thread milling tool having a diameter of approximately 0.125 inches will deflect as much as a thread milling tool having a diameter of approximately 0.500 inches. Therefore, the back taper amount in inches will be a constant for all diameters of the thread milling tool.

Figure 3:
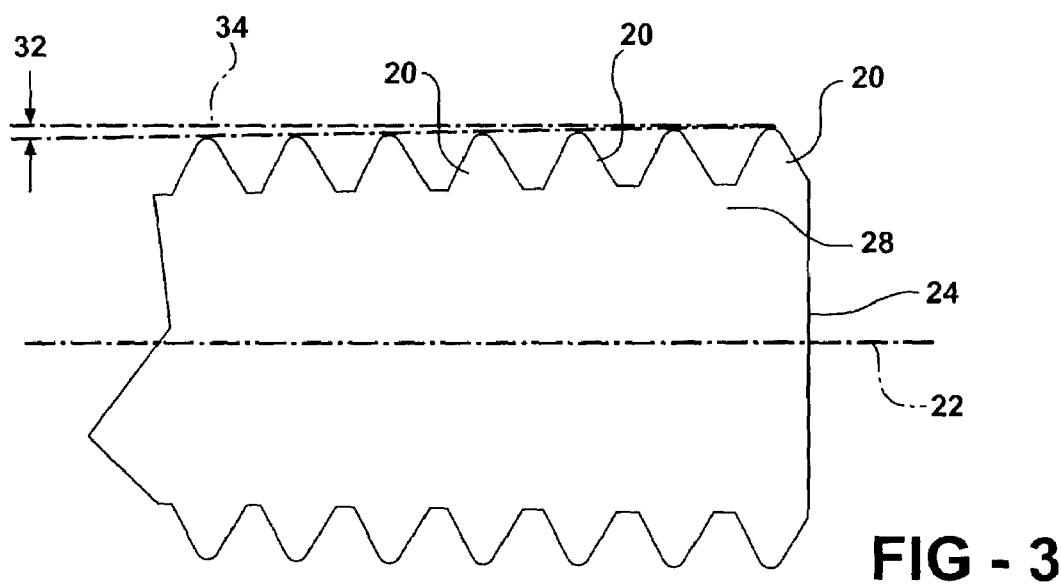
FIG. 3 is an enlarged view generally of region III of FIG. 1, showing the taper angle of the terminal region of a thread form of the thread milling tool illustrated in FIG. 1.

With reference to FIG. 3, each of the thread forms 28 also defines a negative taper angle or back taper 32 of the thread milling tool 10 that is defined by a successive increase in the distance between the central rotational axis 22 of the tool 10 and the crest of individual cutting teeth 20 as the cutting teeth 20 approach the terminal end 24 of the tool 10. In other words, the distance between a line 34 parallel to the central rotational axis 22 of the tool 10 and the crest of the individual cutting teeth 20 increases as the cutting teeth 20 approach the shank portion 14 of the tool 10. Specifically, the negative taper angle or amount of back taper 32 of the tool 10 of the present invention may be in a range from about 0.0005 inches to about 0.010 inches in length of cut. For example, a thread milling tool having a diameter of about 0.375 inches proximal the terminal end 24 of the cutting portion 12 and a back taper of about 0.002 inches will have a diameter of about 0.373 inches as the cutting portion 12 nears the shank portion 14. For a thread milling tool with a substantially identical amount of back taper in different cut lengths, the negative taper angle or back taper 32 will vary between about 0 degrees 1 minute per side to about 0 degrees 25 minutes per side. It will be appreciated that the invention is not limited by the negative taper angle or amount of back taper, and that the invention can be practiced with any suitable negative taper angle or back taper amount. The appropriate negative taper angle will, of course, depend on the specifications of the threads to be produced, and such specifications are well known to those having ordinary skill in the thread milling arts.

In a conventional thread milling tool with a zero taper angle and/or a positive taper angle, the distance between the central rotational axis of the tool and the crest of individual cutting teeth will decrease as the cutting teeth approach the terminal end. In other words, the cutting teeth in a conventional thread milling tool are larger near the shank portion as compared to the cutting teeth near the terminal end of the tool. As the cutting teeth of a thread milling tool become worn, the side forces becomes larger and the positive taper angle or amount of taper in the cutting teeth becomes larger. Thus, a conventional thread milling tool exhibits a high degree of wear at the terminal end of the tool as compared to near the shank portion. By providing the cutting teeth 16 of the tool 10 of the present invention with a negative taper angle or back taper, the deflection caused by the cutting forces can be offset, thereby providing a thread milling tool with less variation in gauging due to the deflection caused by the cutting forces.

The present inventor has verified through analytical and experimental work that thread milling tools constructed according to the present invention, which incorporate a negative taper angle or back taper, provides better machining performance in the form of prolonged tool life and improved thread quality. The advantages provided by thread milling tools constructed according to the present invention are demonstrated experimentally by comparing the performance characteristics of a conventional thread milling tool with the performance characteristics of a thread milling tool with a negative taper angle or back taper constructed according to the present invention.

The test thread milling tool within the present invention included a helix angle of approximately 25 degrees and cutting teeth with a back taper of about 0.002 inches defining a thread form that produced 18 threads per inch (TPI) unified (UN) threads. It was found that a back taper of about 0.002 inches was an optimum amount of back taper for the test thread milling tool that is substantially identical to that generally shown in FIGS. 1–3. The comparison was conducted with an identical conventional thread milling tool with a zero taper angle and identical ISO standard 18 TPI UN threaded forms. The two thread milling tools were tested under the following milling conditions:

Workpiece Material: 4140 Steel 29–30 Rc hardness
Pre-drilled hole size: 0.500 inches
Threadmill: 0.375 inch diameter×0.750 inch cut length 4 flute high speed steel 18 pitch uncoated
Speed of Mill: 88 SFM, or 901 RPM
Feed Rate at 9/16 inch diameter: 0.0015 chip per tooth or 5.4 inches/min
Thread Cut: 9/16–18 UNF thread×0.687 inch deep
Thread Gage: Go PD: 0.5205 inches, No Go PD: 0.5264 inches
Machine: Haas Mini-Mill 3 axis CNC Vertical Machining Center (2001 Model)

During the threading operation, the thread milling tool is simultaneously rotated about its central rotational axis and moved axially to mill chips from the workpiece being threaded. The process of forming threads using a thread milling tool is known to those of skill in the art and, for that reason, is not described in detail herein. Because the test milling tool of the invention had about 0.002 inch back taper on diameter and was about 0.373 inch diameter near the shank portion, a cutter offset of about 0.002 inches on diameter was utilized to make the threaded diameter at the top of the workpiece substantially the same on both tests.

The test results indicating the number of threads that the gage was able to penetrate into the workpiece is shown in Table 1 below. No adjustments for cutter diameter were made for the life of each test. Gaging took place after the test runs were completed.

TABLE 1

| Test Number | Straight Tool (Zero Taper Angle) | Invention (Negative Taper Angle) |
| --- | --- | --- |
| 1 | 12 | 12 |
| 2 | 11 | 12 |
| 3 | 11 | 12 |
| 4 | 10 | 12 |
| 5 | 11 | 12 |
| 6 | 11 | 12 |
| 7 | 11 | 12 |
| 8 | 11 | 12 |
| 9 | 10 | 12 |
| 10 | 10 | 12 |
| 11 | 10 | 12 |
| 12 | 10 | 12 |
| 13 | 10 | 12 |
| 14 | 10 | 12 |
| 15 | 10 | 12 |
| 16 | 10 | 12 |
| 17 | 10 | 12 |
| 18 | 10 | 12 |
| 19 | 10 | 12 |

As shown in Table 1, the test straight milling tool with a zero taper angle or no back taper displayed wear and the diameter would have needed to be adjusted to gage all 12 threads. The tested thread milling tool of the invention with a negative taper angle or back taper to offset the deflection caused by side forces did not need to be adjusted for wear and all 12 threads did not vary in gauging. It is contemplated that a thread milling tool with a positive taper angle would produce worse test results than the thread milling tool with a zero taper angle. Thus, the tested thread milling tool of the present invention produces threads of higher quality over the service life of the tool than conventional thread milling tools with a zero taper angle and/or positive taper angle.

The documents, patents and patent applications referred to herein are hereby incorporated by reference.

While the invention has been specifically described in connection with various embodiments thereof, it is to be understood that this is by way of illustration and not of limitation, and the scope of the appended claims should be construed as broadly as the prior art will permit.

What is claimed is:

1. A thread milling tool comprising:
    a shank portion;
    a cutting portion including at least one helically oriented flute defined by a helix angle less than 40 degrees and a plurality of thread milling teeth,
wherein said plurality of thread milling teeth define a back taper, and
wherein said back taper is in a range between about 0.0005 inches to about 0.010 inches in length of cut.

2. The thread milling tool according to claim 1, wherein said back taper is about 0.002 inches.

3. The thread milling tool according to claim 1, wherein said at least one helically oriented flute is defined by a helix angle of approximately 25 degrees.

4. The tread milling tool according to claim 1, wherein said plurality of thread milling teeth have a thread form that produces treads on a workpiece conforming to ISO standards.

5. The thread milling tool according to claim 4, wherein said thread form produces 18 TPI UN threads.

6. A method of making a thread milling tool, comprising:
    forming a shank portion;
    forming a cutting portion including at least one helically oriented flute defined by a helix angle less than 40 degrees and a plurality of thread milling teeth, whereby said plurality of thread milling teeth define a back taper, and whereby said back taper is in a range between about 0.0005 inches to about 0.010 inches in length of cut.

7. The method according to claim 6, wherein said back taper is about 0.002 inches.

8. The thread milling tool according to claim 7, wherein said plurality of tthread mpilling teeth have a thread form that produces threads on a workpiece conforming to ISO stantdards.

9. The thread milling tool according to claim 4, wherein said thread form produces 18 TPI UN threads.

10. A method of making a thread milling tool, comprising:
    forming a shank portion;
    a cutting portion including at least one helically oriented flute and a plurality of thread milling teeth, wherein said plurality of thread milling teeth define a back taper in a rabge between about 0.0005 inches to about 0.010 inches in length of cut.

11. The thread milling tool according to claim 10, wherein said back taper is about 0.002 inches.

12. The thread milling tool according to claim 10, wherein said at least one helically oriented flute is defined by a helix angle less than 40 degrees.

13. The thread milling tool according to claim 12, wherein said at least one helically oriented flute is defined by a helix angle of approximately 25 degrees.

14. The thread milling tool according to claim 10, wherein said plurality of thread milling teeth have a thread form that produces threads on a workpiece conforming to ISO stantdards.

15. The thread milling tool according to claim 14, wherein said thread form produces 18 TPI UN threads.

16. A method of making a thread milling tool, comprising:

forming a shank portion;

forming a cutting portion including at least one helically oriented flute and a plurality of thread milling teeth, whereby said plurality of thread milling teeth define a back taper in a range between about 0.0005 inches to about 0.010 inches in length of cut.

17. The method according to claim 16, wherein said at least one helically oriented flute is defined by a helix angle less than 40 degrees.

18. The thread milling tool according to claim 16, wherein said plurality of thread milling teeth have a thread form that produces treads on a workpiece conforming to ISO standards.

19. The thread milling tool according to claim 16, wherein said thread form produces 18 TPI UN threads.

20. The method according to claim 16, wherein said back taper is about 0.002 inches.

21. The method according to claim 16, wherein said at least one helically oriented flute is defined by a helix angle less than 40 degrees.

22. The thread milling tool according to claim 21, wherein said at least one helically oriented flute is defined by a helix angle of approximately 25 degrees.

* * * * *